(12) United States Patent
Atkinson

(10) Patent No.: US 7,093,655 B2
(45) Date of Patent: Aug. 22, 2006

(54) METHOD FOR THE RECOVERY OF HYDROCARBONS FROM HYDRATES

(76) Inventor: Stephen Atkinson, Zanderijpad 24, NL-2242 GW, Wassenaar (NL)

( * ) Notice: Subject to any disclaimer, the term of this patent is extended or adjusted under 35 U.S.C. 154(b) by 107 days.

(21) Appl. No.: 10/807,152

(22) Filed: Mar. 24, 2004

(65) Prior Publication Data

US 2004/0198611 A1     Oct. 7, 2004

Related U.S. Application Data

(63) Continuation-in-part of application No. PCT/GB02/04382, filed on Sep. 27, 2002.

(51) Int. Cl.
*C07C 9/04* (2006.01)
*E21B 36/00* (2006.01)
*E21B 43/26* (2006.01)
*E21B 43/40* (2006.01)

(52) U.S. Cl. .......... 166/266; 166/267; 166/272.6; 166/272.7; 166/302; 166/303; 166/308.2; 507/267; 585/15

(58) Field of Classification Search ........... 166/50, 166/266, 267, 272.6, 272.7, 302, 303, 308.2; 507/267; 585/15
See application file for complete search history.

(56) References Cited

U.S. PATENT DOCUMENTS

| | | | |
|---|---|---|---|
| 1,866,560 A | 7/1932 | Gordon | 95/231 |
| 3,930,539 A | 1/1976 | Curtis | 166/300 |
| 4,007,787 A | 2/1977 | Cottle | 166/267 |
| 4,265,311 A | 5/1981 | Ely | 166/271 |
| 4,424,866 A | 1/1984 | McGuire | 166/303 |
| 4,681,372 A | 7/1987 | McClure | 299/8 |
| 4,979,965 A | 12/1990 | Sannholm | 85/194 |
| 5,713,416 A | 2/1998 | Chatterji et al. | 166/263 |

(Continued)

FOREIGN PATENT DOCUMENTS

EP    0611388    9/1996

(Continued)

OTHER PUBLICATIONS

Howard, S.K., SPE30498 "Formate Brines for Drilling and Completion: State of the Art" SPE Annual Technical Conference 1995, pp. 31-44.

(Continued)

*Primary Examiner*—George Suchfield
(74) *Attorney, Agent, or Firm*—Bacon & Thomas, PLLC

(57) ABSTRACT

A method for recovering hydrocarbon trapped in a hydrate formation, comprising the steps of (a) contacting the hydrate formation with an aqueous solution comprising from 10% to 75% by weight of a salt such as potassium formate or acetate salt to liberate hydrocarbon from the hydrate formation and producing a mixture of hydrocarbon and water vapour; (b) transporting the hydrocarbon/water vapour mixture and the aqueous solution to a separator, whereby the said aqueous solution absorbs water vapour from the mixture during the transportation step, to form a more dilute aqueous solution of the alkali metal salt, thereby inhibiting formation of hydrocarbon hydrates; (c) separating hydrocarbon from said dilute aqueous solution; (d) regenerating the aqueous solution of step (a) by heating said dilute aqueous solution to remove absorbed water vapour; and (f) recycling the regenerated aqueous solution to step (a).

15 Claims, 2 Drawing Sheets

U.S. PATENT DOCUMENTS

| | | | |
|---|---|---|---|
| 6,076,278 A * | 6/2000 | Bradley | 34/329 |
| 6,417,417 B1 * | 7/2002 | Sinquin et al. | 585/15 |
| 6,566,309 B1 * | 5/2003 | Klug et al. | 507/90 |
| 6,596,911 B1 * | 7/2003 | Przybylinski et al. | 585/15 |
| 6,867,262 B1 * | 3/2005 | Angel et al. | 525/326.9 |
| 6,894,007 B1 * | 5/2005 | Klug et al. | 507/90 |

FOREIGN PATENT DOCUMENTS

| | | |
|---|---|---|
| GB | 2250761 | 6/1992 |
| WO | WO97/26311 | 7/1997 |
| WO | WO98/18542 | 5/1998 |

OTHER PUBLICATIONS

Fadnes, F.H., SPE50688, Studies on the Prevention of Gas Hydrates Formation inPiplines using Potassium Formate as a Thermodynamic Inhibitor, pp. 497-506 (1998).

Kamath, V.A., et al, Journal of Petroleum Techonology, Nov. 1987, pp. 1379-1388.

* cited by examiner

METHOD FOR THE RECOVERY OF HYDROCARBONS FROM HYDRATES

CROSS-REFERENCE TO RELATED APPILCATIONS

This is a continuation-in-part of International Application No. PCT/GB02/04382, filed 27$^{th}$ Sept. 2002.

BACKGROUND OF THE INVENTION

The present invention relates to methods for recovering hydrocarbons trapped in hydrate formations, and in particular to methods for the recovery of natural gas.

Hydrate formations are an example from a class of chemical compounds known as clathrates. A clathrate is a form of compound in which one component is enclosed within the structure of another. In a hydrate formation, hydrocarbon (such as natural gas) is trapped in molecular cage-like structures formed by frozen water. Although the water molecules and the hydrocarbon molecules do not interact chemically, the hydrocarbon molecules are completely surrounded by the water molecules. The structure of the hydrate must therefore be disassociated in order to free the hydrocarbon. A cubic meter of natural gas hydrate contains typically 160 cubic meters of natural gas.

Hydrate formations can be found in vast quantities in the earth's crust, principally in seabed sediments and in permafrost regions of the world. Conventional natural gas accumulations are thought to underlie many of these hydrate formations, the hydrate formations possibly having been formed when rising natural gas met subterranean water deposits, which then froze form hydrates and enclose the gas.

It is estimated that subterranean hydrate formations, either sub-sea or on land contain over twice the quantity of natural gas, as all the existing provable reserves of conventional accumulations of natural gas. Accordingly, there is a huge potential source of energy if the trapped natural gas can be recovered from these hydrate formations.

Although sub-sea hydrate formations can be located relatively easily by methods such as seismic profiling of the seabed, it has proved difficult or at least very expensive to extract the gas from hydrate formations. Various methods have been developed to address this problem, which employ heat, solution, and reduction of pressure or a combination of the three processes.

Heat can be used to disassociate natural gas from hydrate formations by the introduction of heated solutions into the hydrate formation. Such methods are often somewhat impractical however, due to the heat loss associated with transferring a heat-transfer in order to heat a formation which is located hundreds of metres under the permafrost, or thousands of metres under sea level. U.S. Pat. No. 4,424,866 discloses a method of recovering natural gas from gas hydrate formations by pumping a hot supersaturated solution of calcium chloride or calcium bromide under pressure into the hydrate formation so as to fracture the formation hydrostatically, dissolve the solid hydrate and release the gas. In an alternate heating method disclosed in U.S. Pat. No. 5,713,416, an acidic liquid and a basic liquid are combined and react exothermically to form a hot salt solution, which is injected into a gas hydrate formation in order to decompose the hydrate and release the gas. Both of these methods are uneconomical.

An alternative solution, which is discussed in U.S. Pat. No. 4,007,787 involves the introduction into the gas hydrate formation of freezing point depressants such as methanol, in order to disassociate the hydrate and free the natural gas. However, this method is also expensive, due to the cost of the freezing point depressant. It is also inefficient, since the depressants suggested do not lower the freezing point of the hydrate by an extent sufficient to liberate sufficient natural gas.

U.S. Pat. No. 4,007,787 disclose a pressure reduction method in which the hydrate is disassociated by reducing the ambient pressure. The advantage of this method is that the structure of the hydrate can be broken down without the need to increase the temperature. However, depressurisation methods are also considerably more expensive than conventional gas production methods.

GB-A-2250761 discloses the use of aqueous polysaccharide compositions in well-drilling and oil and gas recovery operations. The compositions can comprise ionic salts. The presence of the alcohol in the aqueous solution allows control of the transition temperature, without substantial variation in composition density. This reference does not address the problem of the recovery of hydrocarbons from hydrate formations.

WO-A-9726311 discloses the use of various mixed salt systems for use as various fluids concerned with drilling operations, such as hydraulic fracturing. This reference is not concerned with the particular problems which arise in the recovery of hydrocarbons from hydrate deposits.

U.S. Pat. No. 1,866,560 is concerned with a method for dehydrating gases, using solutions of calcium chloride. Again, it does not disclose any particular problems which arise in the extraction of hydrocarbons from hydrate formations.

U.S. Pat. No. 4,979,965 is also concerned with a method of dehumidifying gas, in which a salt solution is employed that contains salt crystals, so that the concentration of the salt will not be substantially reduced during absorption This reference is not concerned with hydrocarbon recovery from hydrate deposits.

WO-A-9818542 is concerned with dehydrating natural gases, using a dehydrating composition comprising a glycol and a dissolved salt. The reference is not concerned with hydrocarbon recovery from hydrate deposits.

Even if gaseous hydrocarbon can be extracted from the hydrate by one of the above processes using heat, solution or depressurisation, further problems can arise in transporting the liberated gas back to the ship or rig for refinement and storage. The difficulty is that the liberated gas will be wet, i.e. it will carry with it a proportion of water and water vapour from the hydrate formation, and, at sub-sea temperatures and pressures, the water vapour is likely to freeze, thereby re-forming gas hydrates, which can block the pipeline.

SUMMARY OF THE INVENTION

In accordance with the present invention, there is provided a method for recovering hydrocarbon trapped in a hydrate formation, comprising the steps of:
(a) contacting the hydrate formation with an aqueous solution comprising from 10% to 75% by weight of a formate salt or an acetate salt of an alkali metal, or a mixture of two or more thereof, whereby said aqueous solution liberates hydrocarbon from the hydrate formation, producing a mixture of hydrocarbon and water vapour;
(b) transporting the hydrocarbon/water vapour mixture and the said aqueous solution to a separator, whereby the said aqueous solution absorbs water vapour from the mixture during the transportation step, to form a more dilute aqueous solution of the alkali metal salt, thereby inhibiting formation of hydrocarbon hydrates; and (c) separating hydrocarbon from said dilute aqueous alkali metal salt solution.

In a preferred embodiment, the method includes the additional steps of:

(d) regenerating the aqueous solution of step (a) by heating said dilute aqueous solution to remove absorbed water vapour; and (e) recycling the regenerated aqueous solution to step (a).

For the avoidance of doubt, the phrase "a mixture of two or more thereof" means a mixture of two or more of any possible salt, i.e. it encompasses (separately) the following mixtures: a mixture of different alkali metal formate salts; a mixture of different alkali metal acetate salts; and a mixture of formate and acetate salts.

The total amount of salt in said aqueous solution is from 10% to 75% by weight, preferably at least 40% by weight, and most preferably from 40% to 65% by weight Although formate or acetate salts of any of the alkali metals can be used in the method of the present invention, it is economically advantageous to use formate or acetate salts of potassium, sodium, rubidium or caesium. The most preferred salt is potassium formate. The solution may be heated before it is brought into contact with the hydrate formation.

The use of aqueous solutions of these particular salts has a number of advantages. First, the aqueous solutions are very effective freezing point depressants. This means that said aqueous solution does not need to be heated in order to disassociate the hydrate (although in some circumstances it might be advantageous to heat the solution). Said aqueous solution can therefore be injected through the permafrost at a low enough temperature into the hydrate formation without melting the permafrost and thereby risking a gas leak from the well.

Secondly, the aqueous solutions of the particular salts themselves have very low freezing points. This means that said aqueous solution can be used at a very low temperature, again minimising the risk of a gas leak, without risking solidification of said aqueous solution in the well bore. In addition, the aqueous solutions will not freeze in storage tanks when used in the extreme cold such as is found in the Arctic.

Thirdly, the aqueous solutions of the said salts have the additional advantage of having vapour absorbent properties. When the vapour which is absorbed is water vapour, said aqueous solution can be thought of as acting as a dehydrating agent. The water vapour which is mixed with the liberated natural gas is therefore absorbed by said aqueous solution, forming a dilute aqueous solution, and thereby drying the natural gas. This has the effect that the reformation of gas hydrates in the pipelines leading back to the rig is suppressed. Additionally, the absorption of water vapour by said aqueous solution is accompanied by an increase in temperature of said aqueous solution, which itself acts to inhibit formation of gas hydrates.

Lastly, the solutions in question have a very low corrosive tendency and very low environmental toxicity.

Typically, carbon dioxide is present in the liberated natural gas, and this dissolves in said aqueous solution and lowers its pH, thereby increasing its corrosive tendency. This problem can be addressed either by admixing an alkali (such as potassium or sodium hydroxide, or potassium carbonate), preferably to said aqueous solution before it is recycled, to increase the pH to somewhere in the range 8 to 11, or alternatively to add a corrosion inhibitor such as sodium silicate, a monohydric alcohol, a polyhydric alcohol, a triazole compound, an alkali metal molybdate, or a mixture of two or more thereof.

Said aqueous solution may be injected into the hydrate formation through an insulating jacket, the jacket having a layer of cold insulation fluid comprising an aqueous solution of a formate salt of any alkali metal or an acetate salt of any alkali metal, or a mixture of any two or more thereof. This provides an additional means of ensuring that the permafrost does not melt, and means that, if necessary, said aqueous solution can be heated prior to injection into the hydrate formation An electrical submersible pump can be placed at the bottom of the well in order to reduce pressure on the hydrate formation, or to stimulate higher levels of gas production.

The arrangement may be such that said aqueous solution is circulated down tubing suspended in a cased well in order to displace said dilute aqueous solution from the hydrate formations, thus reducing the need for pumping either into or out of the well. The natural gas liberated from the hydrate may assist in carrying said dilute aqueous solution from the hydrate and into the pipeline, thereby reducing the pumping costs.

When the mixture of gas and said dilute aqueous solution reaches the rig, it is separated, and water vapour is boiled off from said dilute aqueous solution in order to regenerate said aqueous solution from the recycling and reuse.

Steam generated from regenerating said aqueous solution can be used for heating said aqueous solution for re-injection, in order to increase the rate of disassociation of the hydrate. Alternatively, the steam can be used for other heating or power generation requirements.

In a preferred embodiment, the salt (e.g. potassium formate) solution is pumped down a single well drilled into a natural gas hydrate and the gas and water formed by the disassociation of the hydrate produced from the single well through concentric pipe. The hole drilled from the surface may intersect the hydrate formation vertically or be drilled inclined or horizontally to follow the inclination of the deposit.

In a second preferred embodiment two or more wells may be drilled into a hydrate deposit from the surface and connections made between them in the hydrate formation The connecting holes may be drilled inclined, horizontal or multilateral. In this manner the salt solution may be pumped down one well and gas and water recovered from the other(s). The connecting hole through the hydrate formation might also require the support of a slotted pipe or screen if the surrounding formation becomes unconsolidated following the dissociation of the hydrate.

In a further embodiment of both of the methods above under certain favourable geomechanical conditions a horizontally orientated hydraulic fracture might be made in order to extend the contact area to the fracturing fluid within the hydrate formation and thereby facilitate the liberation of trapped hydrocarbon, wherein the fracturing fluid comprises an aqueous solution of a formate salt of an alkali metal or an acetate salt of any alkali metal, or a mixture of two or more thereof. Preferably, said fracturing fluid has the same composition as said aqueous solution.

Fracturing is a well known method for accessing subterranean formations and for stimulating the production of hydrocarbons from such formations. Fracturing fluid is pumped from the surface and down the well drilled into the formation at a sufficiently high pressure to overcome the natural confining pressures in the formation and to induce a fracture in the formation. The opening created will remain open as long as sufficient fluid is injected at a high enough pressure to overcome the effect of fluid seepage from the walls of the induced fracture.

The skilled addressee will be able to select suitable additives for the fracturing fluid from the common general knowledge in the art.

The advantage of using the claimed aqueous solutions as fracturing fluids are that they remain in solution in the induced fractures at very low temperatures, because they have much lower freezing points than other known aqueous fracturing fluids.

The method is only possible however with very shallow hydrate formations where induced horizontal fracturing is possible. As is described above, the horizontal fracture can be maintained at a very low temperature by using the salt solutions described as fracturing fluids.

If favourable elasto-plastic geomechanical conditions exist in the hydrate formation, for instance if beneath a large salt deposit, flow between two wells may be induced by pressurising in the injector well with potassium formate while drawing down pressure in the producing well.

It is important to take care during the process about the way in which the hydrate is dissociated, and the resulting reduction of thickness of the hydrate formation particularly if there is the presence of a high pressure accumulation of conventional gas below the hydrate. In particular, care must be taken that the pressure does not induce a hydraulic fracture in the overlying formations that might result in an escape of gas to the ground surface or the seabed.

The decomposition of gas hydrate increases the level of gas production from underlying gas reservoirs. Depressurisation of the hydrates will enhance production as decomposition progresses.

BRIEF DESCRIPTION OF THE DRAWINGS

A number of preferred embodiments of the invention will now be described, with references to the drawings, in which.

DETAILED DESCRIPTION

Figure 1:
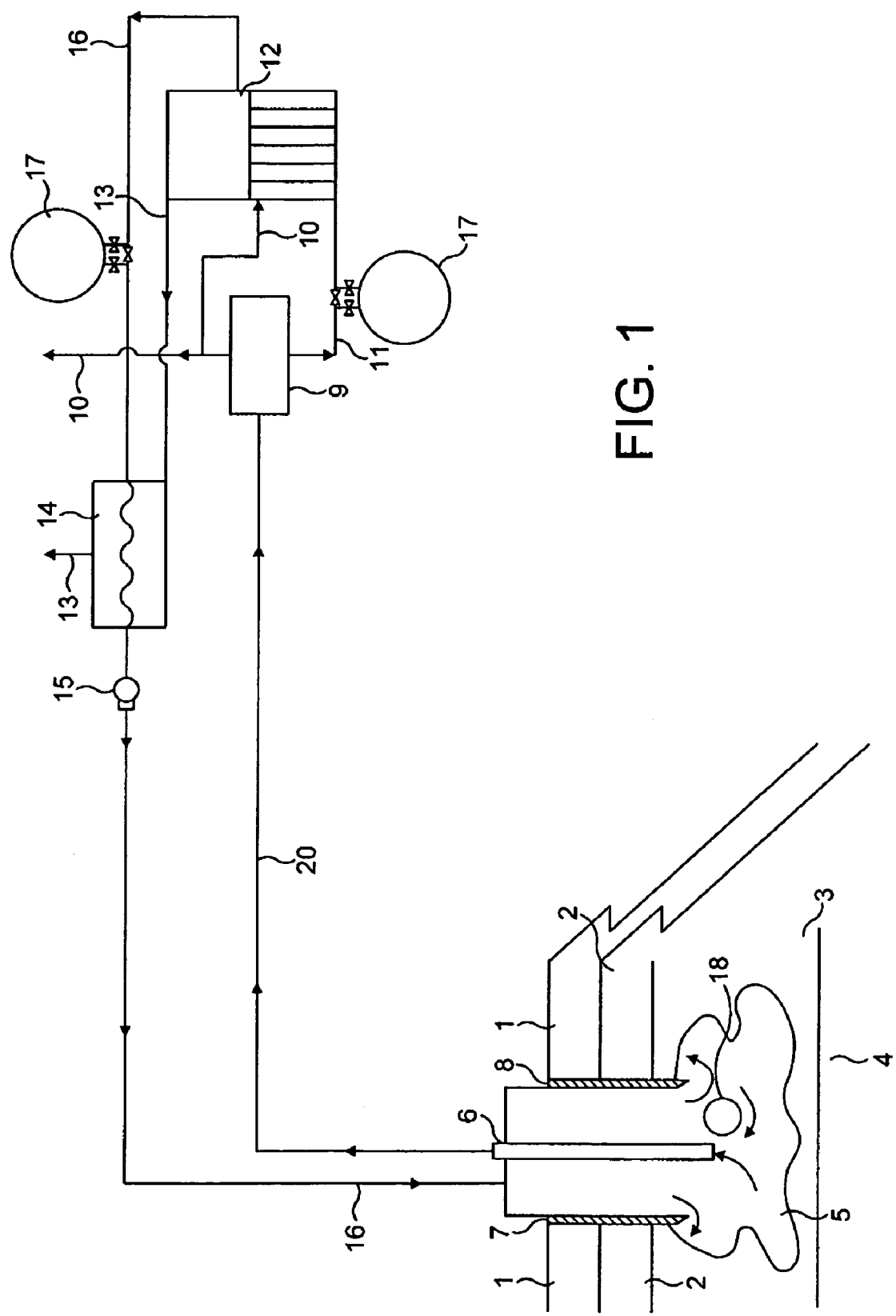
FIG. 1 shows a schematic diagram of a method in accordance with the invention.

Referring to FIG. 1, a well bore 8 is drilled through impermeable cap rock 1 and permafrost 2 into hydrate formation 3 overlying natural gas reservoir 4. Well bore 8 has a casing 7 having an annulus sealed with cement to prevent the escape of gas from well bore 8.

In use, injection booster pump 15 injects an aqueous solution of 65% by weight of potassium formate from the rig down injection line 16, through casing 7 and into hydrate formation 3. The concentrated potassium formate solution acts to dissolve the hydrate formation 3, thereby creating a dissolution zone 5 comprising natural gas, water vapour, and potassium formate solution. These components are pumped up tubing production string 6 by electrical submersible pump 18, and back to the rig along a pipeline 20.

The concentrated potassium formate solution absorbs water vapour in the pipeline 20, thereby inhibiting the formation of gas hydrates.

The mixture of natural gas and dilute formate solution is separated by separator 9, and most of the gas is piped for shipment or storage along pipeline 10.

The dilute formate solution is piped along pipeline 11 to boiler 12, which is powered by a proportion of the recovered gas. The dilute formate solution is boiled in boiler 12 to regenerate concentrated formate solution and water. The water is stored in tanks 17, and the concentrated formate solution (which is now at an elevated temperature) is piped to a heat exchanger 14, where the excess heat is either used to preheat the injection line or sent by a steam along steam line 13 for power generation and/or waste heat provision.

Prior to recycling, sufficient potassium hydroxide or carbonate is added to the formate solution to stabilise the pH of the solution in the range pH 8–11, in order to reduce its corrosive tendencies. Alternatively, a corrosion inhibitor can be added for example one of those mentioned above. The concentrated formate solution can then be sent back to the well bore for re-use.

Figure 2:
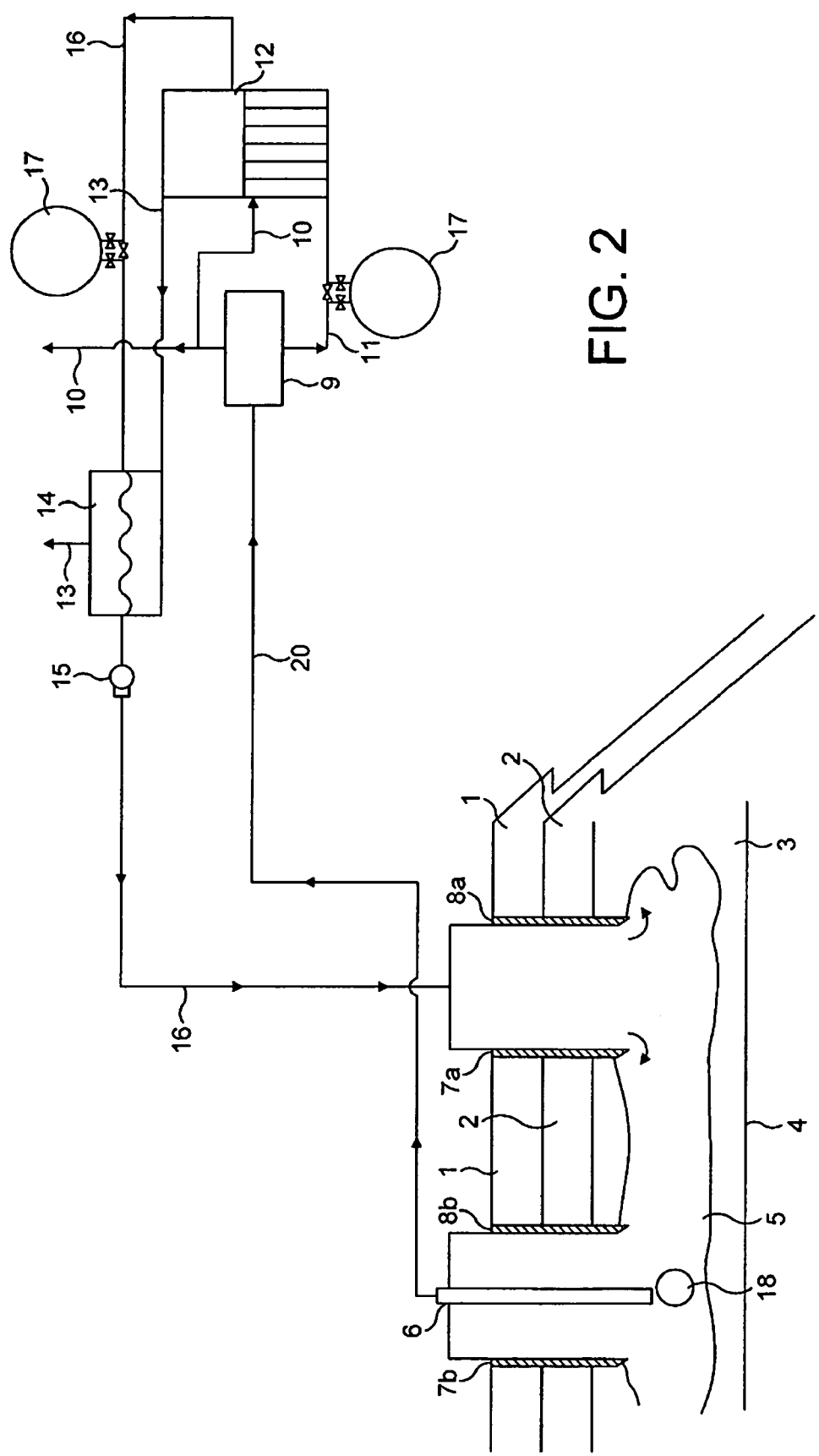
FIG. 2 is a schematic diagram of an alternative embodiment of the method.

Referring to FIG. 2, two well bores 8a and 8b are drilled verticatly through impermeable cap rock 1 and permafrost 2 into hydrate formation 3 overlying natural gas reservoir 4. Well bores 8a and 8b have respective casings 7a and 7b, each of which has an annulus sealed with cement to prevent the escape of gas from well bores 8a and 8b respectively. Other parts of the arrangement of FIG. 2 operate in the same manner as the arrangement of FIG. 1.

Drilling is continued in an inclined or horizontal orientation in the direction from one well to the other, intersecting the hydrate formation. The purpose of this is to be able to provide fluid circulation down an injector well and production up the second interconnected well.

In order to maintain the integrity of the horizontal hole it may be necessary to insert a slotted liner or screen assembly throughout its length. Reservoir modelling can be employed to determine the combined geomechanical and thermodynamic forces on the horizontal opening to determine whether or not such measures are needed in any particular application.

Additional multilateral well openings may be drilled from the vertical well to additonal surrounding vertical wells to increase the area penetrated within the hydrate formation.

It will be understood by one of skill in the art that many modifications of the arrangements specifically described are possible, within the scope of the appended claims.

The invention claimed is:

1. A method for recovering hydrocarbon trapped in a hydrate formation, comprising the steps of
   (a) contacting the hydrate formation with an aqueous solution comprising from 10% to 75% by weight of a formate salt or an acetate salt of an alkali metal, or a mixture of two or more thereof, whereby said aqueous solution liberates hydrocarbon from the hydrate formation, producing a mixture of hydrocarbon and water vapour;
   (b) transporting the hydrocarbon/water vapour mixture and the said aqueous solution to a separator, whereby the said aqueous solution absorbs water vapour from the mixture during the transportation step, to form a more dilute aqueous solution of the alkali metal salt, thereby inhibiting formation of hydrocarbon hydrates; and
   (c) separating hydrocarbon from said dilute aqueous solution.

2. A method as claimed in claim 1, including the additional steps of:
   (d) regenerating the aqueous solution of step (a) by heating said dilute aqueous solution to remove absorbed water vapour; and
   (e) recycling the regenerated aqueous solution to step (a).

3. A method as claimed in claim 2, wherein said fracturing fluid has the same composition as said aqueous solution of claim 1.

4. A method as claimed in claim 1, including the step of subjecting the hydrate formation to hydraulic fracturing with a fracturing fluid in order to depressurise the hydrate formation and thereby facilitate the liberation of trapped hydrocarbon, wherein the fracturing fluid comprises an aqueous solution of from 10% to 75% by weight of a formate or acetate of an alkali metal, or a mixture of two or more thereof.

5. A method as claimed in claim 1, wherein said aqueous solution comprises at least 40% by weight of said salt.

6. A method as claimed in claim 5, wherein said aqueous solution comprises from 40% to 65% by weight of said salt.

7. A method as claimed in claim 1, wherein said salt is potassium formate.

8. A method as claimed in claim 1, wherein said aqueous solution is heated prior to contact with the hydrate formation.

9. A method as claimed in claim 1, wherein said aqueous solution is injected into the hydrate formation through an insulating jacket, the jacket having a layer of insulation fluid comprising an aqueous solution of from 10% to 75% by weight of a formate salt of any alkali metal or an acetate salt of any alkali metal, or a mixture of any two or more thereof.

10. A method as claimed in claim 1, wherein a single well is drilled into a natural gas hydrate deposit, the well having concentric pipes providing at least two passageways, wherein the said salt is pumped down at least one of the said passageways, and gas and water formed by the disassociation of the hydrate are recovered from at least a second of the said passageways.

11. A method as claimed in claim 10, wherein the well is drilled so as to intersect the hydrate deposit vertically or so as to follow the inclination of the hydrate deposit.

12. A method as claimed in claim 1, wherein two or more wells are drilled into a hydrate deposit from the surface and connected by connecting passageways between the said wells in the hydrate formation, and wherein the said salt is pumped down at least one said well, and gas and water formed by the disassociation of the hydrate are recovered from at least a second said well via the said connecting passageways.

13. A method as claimed in claim 12, wherein the connecting passageways are inclined, horizontal or multilateral.

14. A method as claimed in claim 12, wherein the connecting passageways are provided with supports.

15. A method as claimed in claim 12, wherein pressure is applied to the said at least one said well, and wherein reduced pressure is applied to the said at least one second said well.

* * * * *

UNITED STATES PATENT AND TRADEMARK OFFICE
CERTIFICATE OF CORRECTION

| | |
|---|---|
| PATENT NO. | : 7,093,655 B2 |
| APPLICATION NO. | : 10/807152 |
| DATED | : August 22, 2006 |
| INVENTOR(S) | : Stephen Atkinson |

Page 1 of 1

It is certified that error appears in the above-identified patent and that said Letters Patent is hereby corrected as shown below:

On the title page, under the entry for (63), insert:

Item (30) col. 1  Foreign Application Priority Data
              September 28, 2001 [GB] United Kingdom . . . 0123409.5

Signed and Sealed this

Seventh Day of November, 2006

JON W. DUDAS
*Director of the United States Patent and Trademark Office*